Patented Mar. 14, 1933

1,901,728

UNITED STATES PATENT OFFICE

THEODORE F. BRADLEY, OF WESTFIELD, NEW JERSEY, ASSIGNOR TO CHADELOID CHEMICAL COMPANY, OF NEW YORK, N. Y., A CORPORATION OF WEST VIRGINIA

FINISH REMOVER

No Drawing.   Application filed December 2, 1927. Serial No. 237,342.

The present invention relates to the solvent properties of tertiary alcohols and their employment in finish removers, suitable for removing paint, varnish, lacquer and similar coatings from surfaces, for example where it is desired to refinish the articles. Paint, varnish and lacquer removers have been on the market for a long time, and as a typical example of the prior art, I cite a remover in which benzol acts as the wax solvent and penetrating solvent, and acetone acts as the loosening solvent and wax precipitant. Such a remover is useful in practice, but is found to have certain objections.

In accordance with the present invention, I employ a different class of wax solvents, namely tertiary alcohols, such as tertiary butyl alcohol, tertiary amyl alcohol, or the higher homologues of these, but preferably I use tertiary alcohols containing not over ten carbon atoms. Tertiary butyl alcohol has been found by me to have very useful properties for the purpose, notably it has a solvent capacity for example at room temperature for wax, relatively higher for example than the solvent capacity of ethyl alcohol or denatured alcohol. The tertiary butyl alcohol also has excellent solvent properties for oils and fats.

In producing the remover, the wax preferably in a molten state is added to the wax solvent, say tertiary butyl alcohol, after which, in some cases, an alcoholic loosening solvent may be added, which acts to partially precipitate the wax from the solution, leaving the wax in what perhaps may be regarded as a colloided condition, to act as a retarder of evaporation. The best loosening solvent known to me is acetone, but other similarly acting solvents or mixtures may be used alone or therewith, for example, methyl acetone, or other ketones, alcohol, denatured alcohol, wood alcohol, esters such as ethyl acetate, or other solvents known in the prior art. Mixtures of these solvents also can be employed, thus a mixture of acetone and methyl acetone is very satisfactory or a mixture of acetone and denatured alcohol. All of these substances are included hereinafter in the expression "alcoholic loosening solvent" which expression has been heretofore employed in the patents on this art.

As a specific example of my invention, I cite a mixture of equal volumes of acetone and tertiary butyl alcohol, together with 2 per cent of paraffin wax, the wax being preferably first melted and added to the tertiary butyl alcohol, well mixed therewith and then the acetone added. Other waxes such as beeswax, ceresin wax, and the like, may be employed as a substitute for all or a portion of the paraffin wax. Mixtures of waxes likewise may be employed. Two per cent has been referred to, but it is also possible to use much smaller percentages of the wax, say one-half of one per cent of paraffin wax has been found to substantially retard evaporation.

It will be understood that the invention is not restricted to the use of the above mentioned compounds alone, but other substances heretofore recognized in the art may be added, for the production of known effects, for example, the use of methyl acetone in conjunction with the acetone, to retain the wax in a colloided condition over a protracted period of time.

In addition to the tertiary alcohol alone as a wax solvent, it may be advisable in some cases to increase the wax-solvent capacity of the remover by the use of hydrocarbon wax solvents such as benzol. Thus a mixture of benzol, tertiary butyl alcohol and wax may be used. Mixtures of two or more tertiary alcohols with each other also may be used.

The tertiary alcohols used in the present invention preferably are those of the saturated aliphatic series, i. e., homologues of isobutyl alcohol, which are liquid at room temperature; preferably containing from 4 to 10 carbon atoms.

I have prepared a variety of paint and varnish removers employing tertiary alcohols of the foregoing type, of which the following are illustrations:

*Finish remover A*

| | Parts by weight |
|---|---|
| Tertiary butyl alcohol | 49 |
| Paraffin wax | 4 |

The wax is mixed with the tertiary butyl alcohol and the latter is heated to facilitate solution, or the wax may be melted and added to the tertiary butyl alcohol, which preferably should be warmed slightly before the addition of the wax and stirred to thoroughly mix.

*Finish remover B*

| | Parts by weight |
|---|---|
| Tertiary amyl alcohol | 49 |
| Ceresin wax | 4 |

This finish remover may be prepared in a manner similar to finish remover A.

Finish removers of different solvent composition may be made by modifying finish removers A and B, by the addition of other paint and varnish solvents. Thus, to 1 volume of finish remover A, I have added an equal volume of methyl acetate to form a modified remover. I have also substituted a like amount of ethyl acetate, also isopropyl acetate, also butyl acetate and amyl acetate. In the case of the ketones I have added an equal volume of acetone or ethyl methyl ketone and also of mesityl oxide. Instead of using esters such as the acetates or the various ketones, I have likewise employed with finish remover A, an equal volume of denatured alcohol, or secondary butyl alcohol and of normal amyl alcohol. In like manner I have prepared modified finish removers by adding these same finish solvents to remover B.

It should be understood, however, that in using these proportions I do not intend to limit myself in any way as the formulæ stated are for illustrative purposes and I may modify the proportions of the mixed finish solvents to a very considerable degree, such finish removers, however, always containing an alcohol of the tertiary type.

When hydrocarbon solvents, which are strong solvents for waxes are employed, it is desirable, in some cases, not to use these in large proportion. Thus, benzol, toluol or gasoline, may be added to remover A or B in the proportion of about 20 per cent. A larger proportion of wax should be present if the hydrocarbons are used in much larger ratio.

Thus my invention contemplates a finish remover comprising as a finish solvent and as an adequate wax solvent an alcohol of the tertiary type, with or without various modifying solvents for paint and varnish coatings as illustrated above.

Furthermore, I may employ in the composition a thickening agent such as nitrocellulose, soap, and the like, to give a body or viscosity to the product and thus enable it to be better applied to vertical surfaces where the proportion of wax is quite low. Nitrocellulose is advantageous, especially that of the high viscosity type, in serving as a protective colloid for the wax. I have used nitrocellulose in this way in compositions containing the tertiary alcohol with from 40 to 50 per cent, or more, of esters or ketones. Cellulose acetate, likewise may be employed as a wax protective colloid when 50 per cent or more of ketones or other solvent for cellulose acetate is present.

The term "wax solvent" as used herein, in connection with the tertiary alcohols, of course means that in the compositions referred to, the alcohol is the liquid which dissolves the wax. In general, alcohols have been used in removers as wax precipitants.

What I claim is:—

1. A finish remover containing tertiary butyl alcohol as the essential wax solvent, and wax dissolved therein.

2. A finish remover consisting essentially of wax and an alcoholic loosening solvent and an alcoholic wax solvent in amount sufficient to hold a film-forming quantity of wax, and which loosening solvent is readily miscible with said wax solvent.

3. A finish remover comprising acetone and wax and an alcoholic wax solvent which is readily miscible with the acetone, said alcoholic wax solvent being present in amount sufficient to hold a film-forming quantity of wax.

4. A finish remover comprising a wax, an alcoholic loosening solvent and a tertiary alcohol acting as the essential wax solvent.

5. A finish remover comprising an alcoholic loosening solvent and wax and a tertiary alcohol containing about 4 to 10 carbon atoms acting as the essential wax solvent.

6. A finish remover comprising wax and a tertiary alcohol functioning as wax solvent, in amount sufficient to hold a film-forming quantity of wax.

7. A finish remover comprising wax, a tertiary alcohol having wax-solvent properties in amount sufficient to hold a film-forming quantity of wax, and alcoholic loosening solvents miscible therewith.

8. A finish remover containing a tertiary alcohol having four to ten carbon atoms, as the essential wax solvent, and wax dissolved therein.

9. A finish remover containing a wax and a tertiary alcohol having four to ten carbon atoms, as the essential wax solvent, said tertiary alcohol being is excess over any other wax solvent present.

10. A finish remover containing a wax and containing a tertiary alcohol, said tertiary alcohol being present in an amount sufficient to dissolve substantially all of said wax if the two were present in a composition consisting solely of said wax and said alcohol.

In testimony whereof I affix my signature.

THEODORE F. BRADLEY.